3,399,249
SULFOPROPYLATED OLEFIN BLOCK COPOLY-
MERS HAVING TERMINAL SEGMENTS CON-
TAINING AMINO GROUPS
Donald E. Hostetler, Monroeville, Pa., assignor, by mesne
 assignments, to Rexall Drug and Chemical Company,
 Los Angeles, Calif., a corporation of Delaware
No Drawing. Filed Jan. 12, 1966, Ser. No. 520,043
11 Claims. (Cl. 260—878)

The present invention relates to a novel and useful composition and to a process for producing such a composition. More particularly it relates to a polypropylene composition having better printability and dyeability properties than polypropylene known heretofore in the art.

In summary my invention comprises treating a crystalline polypropylene comprising a polypropylene having a terminal polar copolymer segment containing an amino group, with 3-hydroxy-1-propane sulfonic acid sultone.

As heretofore known, propylene can be polymerized to a high molecular weight solid polymer by contacting propylene with a catalyst such as titanium trichloride/triethylaluminum. Typical methods for preparing polypropylene are disclosed in Belgian Patent 538,782 and U.S. Patents 2,949,447; 2,911,384 and 2,824,721. Generally such processes produce propylene polymers having a molecular weight of from about 50,000 to about 5 million with a major proportion of the polymer crystalline in that it exhibits a crystalline structure by X-ray analysis and is insoluble in heptane. Crystalline polypropylene is well known in the art for its highly desirable properties such as high tensile strength, high modulus of elasticity and good resistance to elevated temperatures. However, in spite of these desirable physical properties crystalline polypropylene is difficult to print on without pretreatment of the polymer surface. Since polypropylene is a low cost competitor of cellophane in the food wrapping and packaging industry, these defects are formidable obstacles to polypropylene's wide spread acceptance by the industry.

However, as known in my laboratory, if polypropylene is formed with a terminal block segment of a polar block copolymer containing an amino group in situ, said polypropylene has improved dyeability with acid dyes. I have now found that the polypropylene/amino group block copolymer when treated with the 3-hydroxy-1-propane sulfonic acid sultone ("propane sultone") results in a polypropylene composition containing sulfopropylated amines capable of being dyed by both acid and basic dye-types by conventional dye procedures especially in mono- and multifilament applications.

It is therefore, the object of the present invention to provide a polypropylene composition which has improved printability and dyeability without necessitating any pretreatment of the polypropylene surface.

The term crystalline polypropylene as used in my application means a propylene homopolymer, a propylene/ethylene random copolymer or a propylene/ethylene block copolymer. These polymers may be prepared in situ by any method known in the art; preferably, that described in French Patents 1,351,024 and 1,358,708.

By the term "an amino group" is meant any one of a number of organic compounds which can be represented as:
R₃N, R₂NH, and RNH₂ wherein R represents any aromatic or aliphatic organic radical, whether substituted or not. These three groups of amines are known in the art as tertiary, secondary, and primary amines, respectively. It is evident that tertiary and secondary amines can be heterocyclic-N compounds as well as simple aromatic and aliphatic, while primary amines cannot be found in a heterocyclic-N compound, but can be both part of an aliphatic or aromatic compound.

By the term "terminal polar copolymer segment containing an amino group" is meant that segment of the polypropylene copolymer chain which is formed by the polymerization of an organic compound containing an amino group. Of necessity, amino-containing grouping are considered to be polar, due to the electronic structure of the nitrogen atom in the molecule.

The only limitation placed by my invention on the suitability of the amino compound, is that the compound must be able to be polymerized using the conditions described below, to form a block copolymer segment on a polypropylene composition in situ. Many available compounds will come to mind to one skilled in the art, but especially preferred are 2-vinylpyridine, 4-vinylpyridine, 2-methyl-5-vinylpyridine, dimethylaminoethylvinyl ether tetrahydrofurfurylamine, dimethylaminoethylacrylate, and dimethylaminoethylmethacrylate.

A number of other sultone compounds can be used instead of the propane sultone; notable examples include, but are not limited to, butane sultone (4-hydroxy-1-butane sulfonic acid sultone) and pentane sultone (5-hydroxy-1-pentane sulfonic acid sultone).

It will also be obvious to anyone skilled in the art that various organic sulfonic acids can be employed in my invention. Examples eminently suitable include, but are not limited to, various lower alkane sulfonic acids, i.e., methane sulfonic acid, ethane sulfonic acid, propane sulfonic acid, butane sulfonic acid, pentane sulfonic acid and others.

In a preferred embodiment of my invention the terminal block of the amino-containing copolymer is employed in the polypropylene in the range of 1 to 5% by weight although the terminal block copolymers can be operably formed in the range 0.1 to 25% by weight based on the weight of the polymer in the composition.

The percentages by weight are based upon the propylene and the comonomer used to form the crystalline polypropylene compositions. Should other polymers or materials be added to the compositions of the present invention the weights of such added materials are excluded from weight percentage calculations.

The following examples are given to illustrate the invention and are not intended to limit it in any manner. In all examples all parts are expressed by weight unless otherwise indicated.

The melt index of the example is expressed in decigrams per minute as measured by ASTM–D–1238–62T, Condition L.

Example 1.—Polypropylene with a terminal block of tetrahydrofurfurylamine

To a 700 ml. stirred stainless steel pressure reactor is charged, under an argon atmosphere, 0.31 g. of

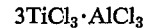

and 3.1 cc. of 1.0 molar diethyl aluminum chloride in cyclohexane. The Al/Ti mole ratio is 1.5 to 1. The reactor is purged with hydrogen, closed, and pressured to 5 p.s.i.g. with hydrogen. Then 400 ml. of liquid propylene (0.58 g./cc. is introduced with stirring at 75° F. The polymerization temperature is increased within about 5–10 minutes to 130° F. with external heating. The reactor pressure is that of the propylene gas at equilibrium.

At the end of the first 45 minutes, 200 ml. of additional liquid propylene are added to maintain a slurry in the reactor. At the end of 1.5 hours the reactor is vented to 9 p.s.i.g., purged with argon, and heated to 110° F. After 5 minutes at 100° F. with a small flow of argon through the reactor, 50 cc. (about 40 g.) of tetrahydrofurfurylamine are sprayed into the reactor. The reactor is then closed and stirred for 1 hour at 140° F.

The polymer is then transferred into a two liter beaker and slurried for 2 hours at 70° F. with 1 liter of a 50/50 volume mixture of heptane and isopropyl alcohol. The hot slurry is then filtered and the washing repeated with fresh heptane-isopropyl alcohol mix. After filtering, the washed polymer is vacuum dried for 4 hours at 80° C.

A yield of 100 grams of dry powdered polymer is obtained with a melt index of 2.5 according to ASTM-D-1238-62T. By infra-red analysis of the polymer is found to contain 3.0 weight percent tetrahydrofurfurylamine.

A 50 g. sample of the powdered polypropylene-tetrahydrofurfurylamine block copolymer was slurried for two hours at reflux in 200 ml. of acetone containing 25 g. of propane sultone. The slurry was filtered and the polymer washed for an additional hour in fresh acetone to remove the excess propane sultone. After vacuum drying for 4 hours at 80° C., the polymer weighed 50.4 g. Molded film and fiber of the resin were dyed to a deep green with a basic brilliant dye. The fiber also dyed well with an acid dyebath containing 0.5 weight percent "Acid Blue 22." Without the propane sultone treatment, the polymer showed no affinity for the basic green dye, but was dyeable with the acid dye.

Example 2.—Polypropylene/polyethylene random copolymer with terminal block 4-vinylpyridine To a 700 mol stirred stainless steel pressure reactor are charged, under an argon atmosphere, 0.36 g. of 3TiCl$_3$·AlCl$_3$ and 4.7 cc. of 1.0 molar diethyl aluminum chloride in cyclohexane. The Al/Ti mole ratio is 2/1. The reactor is purged with hydrogen, closed, and pressured to 5 p.s.i.g. with hydrogen. Then 400 ml. of liquid propylene (0.58 g./cc.) are increased within about 10 minutes to 140° F. with external heating. The reactor pressure is that of the propylene gas at equilibrium. Five minutes after the propylene charge, 0.4 g. of ethylene is added gradually over a period of 15 seconds. The ethylene addition, which is used up in 1 to 2 minutes, is repeated every 15 minutes until 2.8 g. of ethylene are added. The propylene concentration is maintained in the reactor by adding 15 cc. of liquid propylene every 5 minutes during the run. At the end of 1.75 hours the reactor is vented to 0 p.s.i.g., purged with argon and heated to 150° F. After 10 minutes at 150° F., with a small flow of argon through the reactor, 10 cc. (9.8 g.) of 4-vinylpyridine are sprayed into the reactor. The reactor is then closed and stirred for 3 hours at 130° F.

The polymer is then transferred into a two liter beaker and slurried for 2 hours at 70° C. with 1 liter of a 50-50 volume mixture of heptane and isopropyl alcohol. The hot slurry is then filtered and the washing repeated with fresh heptane-isopropyl alcohol mix. After filtering, the washed polymer is vacuum dried for 4 hours at 80° C.

A yield of 140 g. of dry powdered polymer is obtained with a melt index of 230° C. according to ASTM-D-1238-62T of 2.1. By infrared analysis the polymer is found to contain 2.0 weight percent ethylene and 5.7 weight percent 4-vinylpyridine. A 50 g. sample of the polymer was slurried as in Example 1 with propane sultone. The treated polymer, when molded into film and fiber showed excellent affinity for both acid and basic dye types.

Example 3.—Polypropylene/polyethylene block copolymer with terminal block 2, methyl-5, vinylpyridine To a 700 ml. stirred stainless steel pressure reactor are charged, under an argon atmosphere, 0.34 g. of 3 TiCl$_3$·AlCl$_3$ and 4.9 cc. of 1.0 molar diethyl aluminum chloride in cyclohexane. The Al/Ti mole ratio is 2/1. The reactor is purged with hydrogen, closed, and pressured to 5 p.s.i.g. with hydrogen. Then 400 ml. of liquid propylene (0.58 g./cc.) are introduced with stirring at 75° F. The polymerization temperature is increased within about 10 minutes to 140° F. with external heating. The reactor pressure is that of the propylene gas at equilibrium. Five minutes after the propylene charge, 0.5 g. of ethylene is added gradually over a period of 15 seconds. The ethylene addition, which is used up in 2 minutes, is repeated every 15 minutes until 3.5 g. of ethylene are added. The propylene concentration is maintained in the reactor by adding 15 cc. of liquid propylene every five minutes during the run. At the end of 1.75 hours the reactor is vented to 0 p.s.i.g. and heated to 130° F. Ethylene is again added at 1.0 g./minute for 10 minutes. Five minutes later the pressure is 5 p.s.i.a. After 5 minutes at 150° F. with a small flow of argon through the reactor, 10 cc. (9.7 g.) of 2-methyl-5-vinylpyridine are sprayed into the reactor. The reactor is then closed and stirred for 1 hour at 130° F.

The polymer is then transferred into a two liter beaker and slurried for 2 hours at 70° C. with 1 liter of a 50-50 volume mixture of heptane and isopropyl alcohol. The hot slurry is then filtered and the washing repeated with fresh heptane-isopropyl alcohol mix. After filtering, the washed polymer is vacuum dried for 4 hours at 80° C.

A yield of 170 g. of dry powdered polymer is obtained with a melt index of 230° C. according to ASTM-D-1238-62T, of 2.0. By infrared analysis the polymer is found to contain 7.1 weight percent ethylene and 3.2 weight percent 2-methyl-5-vinylpyridine. A 15 g. sample of 10 mil fiber of polypropylene-2-methyl-5-vinylpyridine block polymer was immersed for one hour in a stirred acetone solution containing 10% propane sultone heated to 50° C. The polymer was washed for an additional hour in fresh acetone and then immersed in an aqueous basic green dye solution. After 10 minutes at 80° C., the fiber was dyed to a deep green color. A control sample of the same untreated fiber showed no affinity for the dye.

I claim:
1. A process for improving the dyeability of olefin block copolymer compositions containing in the polymer chains the grouping

P—A wherein P is an alpha-olefin polymer and A represents a terminal block segment containing an amino group selected from the group consisting of polymerized 2-vinylpyridine, 4-vinylpyridine, 2-methyl-5-vinylpyridine, dimethylaminoethylvinyl ether, tetrahydrofurfurylamine, dimethylaminoethylacrylate, and dimethylaminoethylmethacrylate, said process comprising reacting said copolymer with 3-hydroxy-1-propane sulfonic acid sultone.

2. The process according to claim 1 in which the olefin polymer is chosen from the group consisting of a propylene homopolymer, a propylene/ethylene random copolymer, and a propylene/ethylene block copolymer.

3. The process according to claim 1 in which the polyolefin having a terminal copolymer segment containing an amino group is polypropylene with a terminal block of tetrahydrofurfurylamine.

4. The process according to claim 1 in which the polyolefin having a terminal copolymer segment containing an amino group is a polypropylene-polyethylene random copolymer with a terminal block of 4, vinylpyridine.

5. The process according to claim 1 in which the polyolefin having a terminal copolymer segment containing an amino group is polypropylene-polyethylene block copolymer with a terminal block of 2-methyl-5-vinylpyridine.

6. The process according to claim 1 in which said polyolefin composition is treated with a 5-15% (wt./vol.) solution of said 3-hydroxy-1-propane sulfonic acid sultone in a ketone solvent at 20-150° C. for ½ to 10 hours.

7. The process according to claim 6 in which said polyolefin composition is treated while in a form chosen from the group consisting of powdered, particle or filament form.

8. A sulfopropylated olefin block copolymer composition containing in the polymer chains the grouping

P—A wherein P is an alpha-olefin polymer and A represents a terminal block segment containing an amino group selected from the group consisting of polymerized 2-vinylpyridine, 4-vinylpyridine, 2-methyl-5-vinylpyridine, dimethylaminoethylvinyl ether, tetrahydrofurfurylamine, dimethylaminoethylacrylate, and dimethylaminoethylmethacrylate, said terminal block segment having been sulfopropylated by reaction with 3-hydroxy-1-propane sulfonic acid sultone.

9. The composition described in claim 8 in which the olefin polymer is polypropylene with a terminal block of sulfopropylated tetrahydrofurfurylamine.

10. The composition described in claim 8 in which the olefin polymer is a polypropylene-polyethylene random copolymer with a terminal block of sulfopropylated 4-vinylpyridine.

11. The composition described in claim 8 in which the olefin polymer is a polypropylene-polyethylene block copolymer with a terminal block of sulfpropylated 2-methyl-5-vinylpyridine.

References Cited

UNITED STATES PATENTS

| 3,073,667 | 1/1963  | Bonvicini et al. | 260—878 |
| 3,151,928 | 10/1964 | Cappuccio et al. | 260—895 |
| 3,293,326 | 12/1966 | Jezl et al.      | 260—878 |
| 3,308,108 | 3/1967  | Feldhoff et al.  | 260—878 |

MURRAY TILLMAN, Primary Examiner.

M. J. TULLY, Assistant Examiner.